US007692576B2

(12) United States Patent
Mainds et al.

(10) Patent No.: US 7,692,576 B2
(45) Date of Patent: Apr. 6, 2010

(54) RADAR IMAGE DISPLAY

(75) Inventors: Michael Gareth Mainds, Ardeley (GB); Andrew Gascoyne-Cecil, Cambridgeshire (GB)

(73) Assignee: Curtiss-Wright Controls, Inc., Charlotte, NC (US)

( * ) Notice: Subject to any disclaimer, the term of this patent is extended or adjusted under 35 U.S.C. 154(b) by 79 days.

(21) Appl. No.: 12/251,211

(22) Filed: Oct. 14, 2008

(65) Prior Publication Data

US 2009/0121923 A1    May 14, 2009

(51) Int. Cl.
*G01S 7/04* (2006.01)
(52) U.S. Cl. .................. 342/185; 342/176; 342/179
(58) Field of Classification Search .......... 342/175–186
See application file for complete search history.

(56) References Cited

U.S. PATENT DOCUMENTS 4,829,308 A * 5/1989 Tol et al. .................... 342/185
6,087,982 A * 7/2000 Liu ............................ 342/185
2009/0051583 A1 * 2/2009 Andrusiak et al. .......... 342/177
2009/0121923 A1 * 5/2009 Mainds et al. .............. 342/185

* cited by examiner

*Primary Examiner*—John B Sotomayor
(74) *Attorney, Agent, or Firm*—Pearne & Gordon LLP

(57) ABSTRACT

A method is provided that facilitates generating a radar image to be displayed by a radar system. The method includes receiving range data and azimuth data carried by a radar signal transmitted from a radar antenna in communication with the radar system, wherein the range data and the azimuth data represent the radar image as a plurality of azimuth segments that collectively form the radar image in a polar coordinate system. The range data and the azimuth data are translated into abscissa data and ordinate data that represent the radar image in a Cartesian coordinate system, and noise is filtered from the radar image, followed by generation of the radar image including the target to be displayed by a display screen to an operator.

23 Claims, 6 Drawing Sheets

RADAR IMAGE DISPLAY

CROSS-REFERENCE TO RELATED APPLICATIONS

This application claims the benefit of U.K. Patent Application No. GB0719880.7, filed Oct. 12, 2007, the entirety of which is incorporated herein by reference.

BACKGROUND OF THE INVENTION

1. Field of the Invention

This application relates generally to an improved radar processing method and system, and more specifically to radar imaging and target identification, and in particular to a method and apparatus for improving the representation of targets within radar images.

2. Description of Related Art

Radar is the primary airspace sensor for ground-based, marine and airborne surveillance and monitoring applications. Its use within both commercial and military environments is widely known, and to date it remains the most effective technique for identifying targets within an area of interest.

Conventional radar display systems have historically been based on cylindrical cathode ray tube (CRT) arrangements, in which a phosphor screen is excited by a sweeping beam that is synchronised with the rotation of the radar antenna. Any target objects within the monitored area give rise to a return (i.e. reflected) radio signal that appears as a 'blip' (e.g. a bright spot/area) on the radar image display. This kind of display is usually referred to as a plan position indicator (PPI), which functions as a range and azimuth map centered on a polar coordinate system. Since the phosphor typically has a long persistence, a target signal will remain visible for several rotations or scans of the sweeping beam. Thus, moving targets are found to leave a visible trail of decayed images on the image display. In this way, the position and velocity of a target can be reliably monitored, allowing an operator to determine the direction in which a target is heading.

Despite the large number of CRT radar display systems that remain in existence, more recent implementations have begun to make use of computer-based technologies and software in order to replace and/or upgrade the more historical image displays. For instance, many modern radar display systems have been implemented within computer workstation environments, in which a radar signal feed is passed to the workstation for display to an operator as a series of real-time radar images. The images are typically displayed via the workstation's monitor, which may be a conventional VDU, TFT or LCD style display device.

In order to successfully implement a radar display system within a workstation environment a large degree of data processing is typically required. Most radar signal feeds are analogue in nature, so it is usual to convert the feed to digital form via an analogue-to-digital converter. The digital radar data is then conventionally processed via a 'Radar Scan Converter' (RSC) that converts the range and azimuth data from a polar coordinate system into a dataset based on rectangular (i.e. Cartesian) coordinates for real-time display on the workstation's monitor.

However, a potential drawback of many such implementations is that the amount of processing power required to perform the digitization and/or conversion is relatively high, which consequently places significant demands on the workstation's CPU and associated memory. In some cases, the CPU demands may be so great that this introduces a significant delay into the image processing, such that the displayed image lags behind the radar signal feed, which is obviously undesirable within most radar applications. To a limited degree, the art has addressed this problem by attempting to 'load-balance' the processing requirements between the CPU and the processing elements on the workstation's graphics card. However, in nearly all cases, such implementations have fallen significantly short of removing the processing burden from the CPU. Therefore, to date, most of the known computer-based implementations of radar display systems are highly CPU intensive.

Computer-based implementations offer significant flexibility and scalability in controlling the display of radar images. Many of the known workstation implementations provide radar images which offer considerably better rendered detail than conventional CRT displays. However, it is usually the case that existing techniques used to process the radar images generally do not make best use of the available data and, in particular, are not especially suited to mitigate against the effects of noise within the radar images. Therefore, the representation of targets within a displayed image may not match those that are theoretically possible given the power and/or resolution of the radar display system.

The present invention seeks to provide a much improved and less CPU intensive method for displaying radar images, so as to enhance the identification and representation of targets by processing the images to extract the maximum amount of information from the radar signal and minimize, or substantially eliminate, sources of background noise.

BRIEF SUMMARY

According to one aspect, the subject application involves a computer implemented method for improving the representation of targets within radar images, including the steps of receiving input data comprising at least one radar image; dividing the image into a plurality of radial components; and applying a filtering means to at least two adjacent radial components to thereby reduce noise in the return signals from any target present within those components.

The method of the present invention is preferably implemented within a conventional computer workstation environment. However, it is to be appreciated that any other suitable computing platform or server rack arrangement may alternatively be used without sacrificing any of the advantages of the invention. In preferred arrangements, the method is implemented within the graphics processing environment of the workstation and makes use of the graphics processing architecture and graphics programmable pipeline (as discussed in greater detail later). By implementing the present method within a graphics processing environment, the radar display system advantageously becomes independent of the processing platform and is no longer limited to any particular operating system. Therefore, the present method is both platform and operating system independent. Moreover, as the implementation makes use of industry standard specifications for cross-language, cross-platform graphics APIs (Application Programming Interfaces) the invention is not limited to specific graphics architectures and therefore may be implemented on any existing or future graphics hardware that supports the standard specifications.

The radar signal feed may be received as an analogue input data and therefore a conversion step may be applied to the feed so as to convert the analogue data into digital form. The conversion step may involve the application of a conventional analogue-to-digital converter and possibly multiplexing stages, so as to preferably generate a 2-dimensional pixelated image. Alternatively, the radar signal feed may be received as a digital data stream, with the conversion being performed within the radar receiver circuitry.

The radar images are passed to the computer workstation, or possibly to a network of workstations etc., for image processing to be performed. The image data is preferably received within the workstation's graphics processing environment (GPE) where filtering of the images can be carried out. The GPE is also preferably responsible for the display of the radar image data, which is discussed in greater detail later.

To process the radar images, each image is preferably converted into an array of data lines, commonly referred to as a 'polar store'. The array may be a memory store preferably maintained in graphics memory, into which the converted radar data is placed for subsequent processing. According to the present method, a radar image is divided (e.g. dissected) into a plurality of radial components which are then converted into data lines within the array. As the radar image data is conventionally based on a polar coordinate system, a polar-Cartesian coordinate transformation may be applied to each radial component during conversion into the array. Any suitable conversion function/algorithm/matrix may be used to effect the coordinate transformation, as commonly known in the art.

References herein to 'radial components' are intended to refer to the azimuths or linear scan elements within the image space which when arranged radially and azimuthally around the point of origin make up the respective 2-dimensional radar images. In a physical sense therefore, each azimuth corresponds to the narrow scan volume that is swept out by the finite width of the radar beam as it rotates about the point of origin. Hence, each azimuth contains the radar signal data that was returned by way of reflection from any targets or other objects (e.g. land masses etc.) within that scan volume.

As the angular extent of each azimuth is defined by the width of the radar beam, it is easy to appreciate that there may be a very large number of azimuths within each 360 degrees of rotation, depending upon the resolution of the radar antenna and other characteristics of the radar system.

By 'point of origin' we mean the location at which the radar beam originates, which in most cases will correspond to the site of the antenna. Evidently, this point will usually also serve to define the origin of the polar coordinate system in the radar images.

The use of a polar store greatly facilitates simplified processing of the radar image data and allows any number of different processing, and in particular, filtering algorithms to be applied to the data to improve and enhance the display of radar images to an operator.

In accordance with the present invention, the provision of a filtering means that is applied to at least two adjacent radial components achieves a 'cross-azimuth' filtering effect that is able to take into consideration the respective contributions of the return signals from any target or targets found to be present within those azimuths. Hence, the data lines in the array that correspond to those azimuths can be manipulated via appropriate filtering algorithms to make best use of the available data, so as to provide improved radar images and better target rendition.

A target within a radar image will typically extend across several azimuths, unless it is extremely small in nature or else has a relatively compact cross-section as viewed along the radial direction. Therefore, a return signal (i.e. a reflected radar pulse) will be present in each of the azimuths across which the target extends. Depending upon the degree to which the radar pulse is reflected, as it sweeps the width of the target, the return signals will vary in intensity between adjacent azimuths. Hence, by performing a cross-azimuth filtering across those azimuths, it is possible to effectively combine the respective contributions of each of the return signals, which is found to significantly improve the overall return signal and mitigate against background noise. Thus, a much better representation of the target may be reproduced within the radar image, while consequently improving the signal-to-noise ratio over the background.

The filtering means preferably comprises a filter function that may serve as a convolution style filter that can be applied to the return signals in those azimuths across which the target resides. In one embodiment, the filter function may be a substantially Gaussian-shaped convolution filter that is convolved with the return signals to give rise to a better representation of the target within the radar image. This result arises from the fact that the intensity of the return signals between the adjacent azimuths will generally vary according to a Gaussian function. Therefore, the convolution of the return signals with a Gaussian-shaped convolution filter will result in better target definition, which thereby improves the rendering of the target when displayed in the radar image.

It is found that a more clearly rendered target enhances identification and may also assist an operator with the quantification of the target's speed and direction throughout successive beam rotations. Hence, the pre-processing step played by the convolution is found to aid automatic target identification routines by providing a more consistently resolved set of targets.

It is to be appreciated however, that any generic convolution style filter may be used in accordance with the present invention, whether Gaussian or some other form of geometric function depending upon the particular application and image processing requirements. The convolution filter coefficients may be selected so as to be range dependent to thereby better reflect the characteristics of the actual data. Moreover, any other filtering techniques may also be applied with or without convolution, consistent with any of the embodiments described herein, including edge enhancers, noise spike rejecters, noise reducers, signal boosters and localized signal thresholds. Each of which leading to an improved representation of data and enhanced target rendition.

Each data line in the polar store preferably comprises a plurality of individual data elements arranged in order of ascending range (i.e. increasing from the point of origin). Each data element will therefore have a value that is indicative of the intensity of any return signal at that range. During the conversion of the radar image into radial components, and hence into corresponding data lines within the array, the conversion step preferably applies a mapping function that maps each pixel within the 2-dimensional radar image to a respective data element in one or more of the data lines. Since targets will generally extend across several azimuths (as discussed above), any particular pixel in the image may therefore be associated with one or more data elements in the array.

The cross-azimuth filtering methodology of the present invention is able to make use of this pixel mapping by applying any number of different filtering algorithms to the values of the data elements associated with a particular level. Hence, not only may convolution style filters be applied to the data, but any other additional or alternative filter steps may also be invoked in accordance with the method of the present invention.

In particularly preferred embodiments, the cross-azimuth filtering may comprise both an 'azimuth filter' and a 'highest wins' filter applied in combination to improve and enhance the displayed radar image. Herein an 'azimuth filter' is intended to refer to any generic convolution style filter that serves as a prescribed filter function for convolving with the radar image data, as discussed in detail earlier. The 'highest wins' filter of the present invention makes use of the multi-element pixel mapping that arises from the conversion of the radar image into the polar store. In one example, this filter operates by identifying the highest value from among each of the values of data elements associated with a particular pixel and consequently assigns the highest value to that pixel. In this way, any return signal may be effectively 'strengthened' by representing the corresponding target by the highest available pixel value, thereby improving its apparent significance and visual impact within the displayed radar image.

This particular filtering technique is especially useful for preserving weaker return signals and for better distinguishing the signal from the background noise. Hence, by way of a 'highest wins' filter the representation of a target can be markedly improved within the displayed image, which may assist with easier identification and subsequent trajectory estimation.

It is to be appreciated that the particular filter or filter combination used in processing the radar images, will depend largely on the characteristics of the radar system from which the images are derived. Therefore, if we are only concerned with relatively large targets (i.e. ones which give rise to return signals across multiple azimuths and across varying range), then an azimuth filter only may be used. However, if it is desired to preserve weaker signals as well, a highest wins filter may alternatively be applied in isolation or in combination with one or more azimuth filters etc. In most cases, the filter parameters and coefficients may be matched to the characteristics of the return signals.

Hence, it is evident that the method of the present invention is able to make best use of the image data by applying innovative filters and filter combinations, so as to improve the representation of targets in radar images and reduce the effects of background noise.

The implementation of the present method within a graphics processing environment is particularly advantageous, since as we have seen, a high degree of platform and operating system independence may be achieved. However, in addition to this, significant improvements in processing speed may be arrived at by making use of the workstation's graphics processing architecture. Most workstations, particularly those of an IBM-compatible personal computer type, contain dedicated video graphics cards that are either integrated into the motherboard or else connect to the motherboard via industry standard interfaces (e.g. PCI, PCI-Express and AGP etc.). To control the output of the graphics card, a graphics pipeline is used to instruct the card to perform various rendering operations. However, modern cards support programmable pipelines that allow the processing architecture to be controlled via code that conforms to a prescribed standard library specification.

The method of the present invention is preferably implemented on a programmable pipeline graphics card, that enables full optimisation of the filtering paradigm and alleviates the processing burden on the workstation's CPU. In preferred embodiments, the filtering means may be implemented as a set of programmable instructions, that may be in the form of a 'shader' operation. A 'shader' is the commonly used term for a set of software instructions that constitute part of the graphics pipeline. Conventional graphics card usually include a Graphics Processing Unit (GPU) that accept and execute the instructions of the shader, and therefore it is possible to control the operation of the GPU via one or more shaders.

Each of the filters of the present invention may be implemented as separate or combined shader operations for execution on the GPU to process the radar image data. Any of the industry standard specifications may be used in accordance with the invention, including, but not limited to, OpenGL and DirectX. However, it should be appreciated that shader operations are only supported in OpenGL 1.5 and above and DirectX 8 and later versions. The currently preferred implementation makes use of the GLSL Shader Language according to the standard OpenGL 2.0 specification.

In preferred embodiments, the filtering means are implemented according to the OpenGL specification and make use of the associated shader language, OpenGL Shading language (GLSL). In this way, the filter shaders may be used on any workstation that has a graphics processing architecture that supports GLSL. Of course, the present method may alternatively be implemented according to the DirectX specification or other proprietary languages, such as Cg developed by NVidia etc. depending on the graphics architecture and the supported graphics standards.

An advantage of implementing the present method within the graphics processing environment of the workstation is that the processing demands on the CPU are dramatically reduced. As most modern GPU architectures correspond approximately to an integrated parallel processing device, the speed of the image processing can be significantly increased over that of a CPU performing the same task. Since the CPU is released from the need to carry out processing of the radar images, it can divert its attention to other operations, so as to avoid any significant drop in the performance of the workstation as experienced by the operator.

The greater speed of the GPU means that the radar images may be displayed in real-time, without introducing any significant delay or lag between the output of the images and the radar signal feed.

To further improve the performance of the workstation, additional processing steps may be implemented on the GPU, in preference to the CPU. Therefore, the polar store conversion and coordinate transformation may all be executed on the GPU via appropriate pipeline operations, which thereby avoids burdening the CPU with relatively high computationally intensive tasks.

Although the above embodiments implement the present method in software within a graphics processing environment, it should be appreciated that any of the conversion, transformation, filtering and display steps may alternatively and/or additionally be implemented within hardware on the video graphics card or other component of the graphics architecture. Therefore, the present invention also relates to a video graphics card that includes a controller, such as a GPU, that is configured via software and/or hardware to implement the steps of the method as set out in any of the disclosed embodiments. The video graphics card may conform to any industry standard interface, such as PCI, PCI-Express or AGP etc.

It should also be noted that the present method may alternatively be implemented within a graphics environment that is integrated with the motherboard of the workstation, or within any shared graphics arrangements (e.g. where the GPU makes use of the workstation's RAM or other resources), without sacrificing any of the advantages of the invention.

The benefits of implementing a radar image display on a computer workstation having a modern graphics processing environment is that the output images may be manipulated and controlled to achieve any number of visual display effects in numerous different output modes. Hence, for example, the output images may be manipulated by an operator to change the projected viewing angle of the image, so that instead of a purely 2-dimensional view (i.e. as seen from above), the radar image may be viewed at an oblique angle to give some perception of depth.

In accordance with the present invention therefore, a number of image manipulation and display algorithms may be incorporated within the graphics processing environment to enable an operator to invoke various visual effects in the output radar images. Hence, in a preferred embodiment, a graphical user interface (GUI) may be provided on the operator's workstation that allows the operator to achieve anyone or more of the following visualizations and/or effects: to re-size and/or manually position the display windows within the display environment in real-time, to have one or multiple display windows simultaneously visible to an operator, to select particular areas of interest within the images for further scrutiny, to zoom in/out within the images to enlarge/decrease the size of target profiles, to alter the viewing angle within the image and change the projection attributes, to represent targets as 3-dimensional objects, to overlay grids or other projections, to display track information for specific objects, to apply any desired grey scale or color palettes for false color display and to merge two or more images.

It should be appreciated that any of the above visualizations or effects may be performed while the radar image data is being updated, so that image manipulation can occur simultaneously with 'live' (i.e. real-time) updates. For example, a displayed image may be resized while the image is being updated. In this way, no loss of information occurs while the data is being actively rendered to the display. As a result, any protracted delay in updating the images can thereby be avoided even when an operator requests some change in the display function.

In addition, any desired underlay image may also be merged with the overlying radar image to enable coastlines, runways, buildings or any other structures to be displayed along with the target objects.

It is to be understood that anyone or more of the image manipulation and/or display algorithms may be implemented as a shader operation. Hence, for instance, false color radar images may be generated by way of an appropriate shader that controls the color of each pixel as a function of the pixel's properties, e.g. value, position within image etc. As a result, the graphics pipeline can be controlled to display a radar image according to any desired color scheme or display mode, thereby permitting a large number of different visualizations of the data.

A shader operation may also be used to implement a 'fading' visual effect in the displayed radar image to emulate the persistence of the phosphor screen in historical radar displays (as discussed earlier). This fading effect is favoured by many operators and consequently it is desirable to preserve this effect, as it is generally useful for determining a target's motion and velocity. Thus, in accordance with the present invention, a fading effect may be achieved by way of a shader that is implemented within the graphics pipeline that creates the impression that the workstation display screen has some degree of persistence. In other words, the GPU can render images so that they emulate the effect of a decaying target within a CRT phosphor screen. The shader can therefore be programmed to control the intensity of each pixel to generate a fading effect within successive images by reducing the values of the pixels associated with a particular target according to an appropriate decay function. In this way, a target may then give rise to a perceptible trail within the radar images that enables an operator to estimate the heading and velocity of the target.

Any suitable function may be used to control the intensities of the pixels in the images, which in preferred arrangements corresponds substantially to an exponential decay function.

The time taken for a decaying target trail to fade within successive images may be controlled by the shader, so that a gradual shading effect similar to that of a CRT phosphor screen may be produced. An optimum fade time is preferably within the range of 1 to 2 minutes, but may be shorter or longer depending on the particular application and desired fading effect.

It is to be appreciated however that any suitable fading technique may be used in accordance with the present effect, including, but not limited to, layered lighting effects as used in standard gaming engines, e.g. 'spiral staircase' effects.

Although the present invention is ideally suited for enhancing the visualization of radar images, and in particular, for improving the representation of targets while reducing background noise, it will be recognized that one or more of the principles of the invention could also be used in other image processing applications where there is a requirement to augment the representation of objects within images by mitigating against the effects of noise.

According to another aspect, the present application involves a method of generating a radar image to be displayed by a radar system. The method includes receiving range data and azimuth data carried by a radar signal transmitted from a radar antenna in communication with the radar system, wherein the range data and the azimuth data represent the radar image as a plurality of azimuth segments that collectively form the radar image in a polar coordinate system. The range data and the azimuth data are translated into abscissa data and ordinate data that represent the radar image in a Cartesian coordinate system, and noise is filtered from the radar image by:

utilizing a return signal contribution reflected by a target from at least two immediately-adjacent azimuth segments to render a representation of the target in the radar image, selecting a highest pixel value from a plurality of different pixel values assigned to be displayed by a common pixel of a radar display to be displayed by the common pixel, or a combination of both utilizing the return signal contribution reflected by the target from the at least two immediately-adjacent azimuth segments and selecting the highest pixel value from the plurality of different pixel values assigned to the common pixel to render the representation of the target to be included as a portion of the radar image to be displayed.

The radar image is generated and includes the target to be displayed by a display screen to an operator.

According to such a method, the radar signal feed can be converted from an analog signal to a digital signal. Converting the radar signal to a digital signal can be performed by an analog-to-digital converter provided to a graphics processing unit of the radar system independent of a central processing unit for controlling general operation of the radar system as a whole.

Translating the range data and the azimuth data into abscissa data and ordinate data, filtering the noise from the radar image, or both translating the range data and the azimuth data into abscissa data and ordinate data, and filtering the noise from the radar image can optionally be performed by a graphics processing unit of the radar system independent of a central processing unit for controlling general operation of the radar system as a whole.

One of translating the range data and the azimuth data and filtering the noise from the radar image can optionally be performed by a graphics processing unit of the radar system independent of a central processing unit for controlling general operation of the radar system as a whole, and another of translating the range data and the azimuth data and filtering the noise from the radar image is performed by a different processing unit provided to the radar system. The different processing unit can be the central processing unit of the workstation for controlling general operation of the radar system as a whole, or at least controlling general the general flow of information among, and optionally operation of the workstation components.

The radar image can be communicated over a communication network such as the Internet, an Intranet, or any other suitable communication network with which the workstation is in communication to be displayed by the display screen.

When the radar image is to be displayed, a point of view of the radar image to be displayed by the display screen can be manipulated in at least one of a first dimension and a second dimension responsive to receiving an input from the operator indicating a desired viewpoint of the radar image. Thus, radar image presented by the display screen can have the point of view of looking directly, straight down onto the target. Such a manipulation can be considered analogous to a keystone correction effect as is known in the art. To so manipulate the point of view includes adjusting an orientation of the radar image in a third dimension. Alternately, or in combination, manipulating the point of view of the radar image optionally further includes conducting a geometric distortion to maintain substantially-overhead point of view of the radar image subsequent to manipulating the point of view.

Targets depicted in the radar image can be displayed as a graphical depiction of the target in real time by pixels of the display screen. The intensity of these pixels can optionally be gradually faded to emulate a persistence of phosphor of a cathode-ray-tube display screen. Gradually fading the intensity of the target in the radar image can be controlled by a graphics processing unit of the radar system independent of a central processing unit for controlling general operation of the radar system as a whole.

According to another aspect, a plurality of the azimuth segments collectively forming the radar image can be selected to overlap such that each overlapping azimuth segment detects a target in a common, overlapping region. Filtering noise from the radar image can optionally include comparing a return signal contribution reflected from the common region for each overlapping azimuth segment, and generating the radar image to include the target within the common region if each return signal contribution is indicative of a presence of the target within the common region.

According to another aspect, a physical computer-readable medium can be provided to store computer-executable instructions for performing any of the method steps disclosed herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The invention may take physical form in certain parts and arrangement of parts, embodiments of which will be described in detail in this specification and illustrated in the accompanying drawings which form a part hereof and wherein.

DETAILED DESCRIPTION

Figure 1:
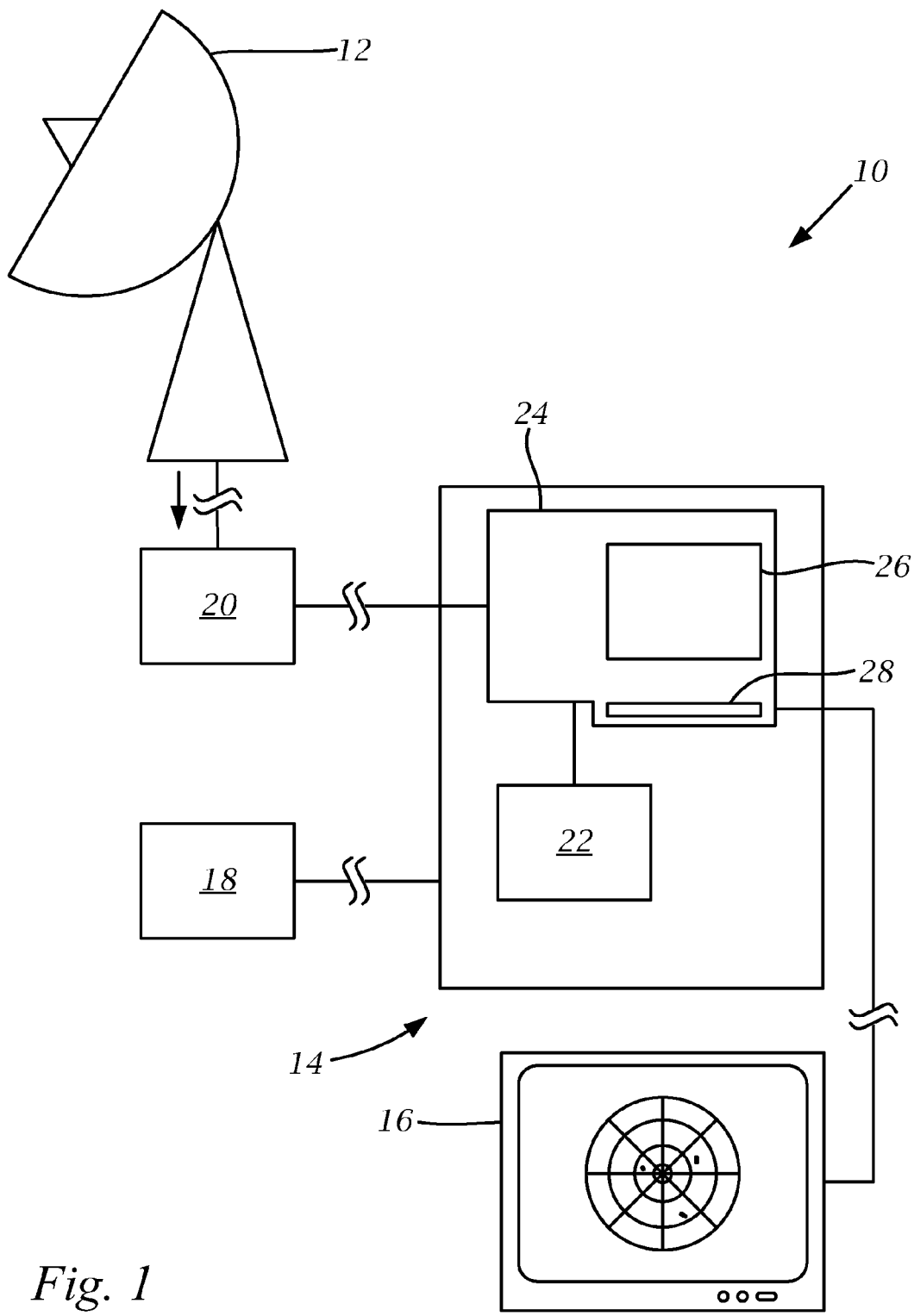
FIG. 1 is a schematic representation of a preferred implementation of a radar display system operating in accordance with an embodiment of a method of the present invention.

Certain terminology is used herein for convenience only and is not to be taken as a limitation on the present invention. Relative language used herein is best understood with reference to the drawings, in which like numerals are used to identify like or similar items. Further, in the drawings, certain features may be shown in somewhat schematic form.

It is also to be noted that the phrase "at least one of", if used herein, followed by a plurality of members herein means one of the members, or a combination of more than one of the members. For example, the phrase "at least one of a first widget and a second widget" means in the present application: the first widget, the second widget, or the first widget and the second widget. Likewise, "at least one of a first widget, a second widget and a third widget" means in the present application: the first widget, the second widget, the third widget, the first widget and the second widget, the first widget and the third widget, the second widget and the third widget, or the first widget and the second widget and the third widget.

Referring to FIG. 1, there is shown a preferred implementation of a radar display system 10 operating in accordance with the method of the present invention. The radar display system 10 comprises a scanning radar antenna 12 of conventional design sited at a location at which the surrounding area is to be monitored, e.g. at an airfield, at a sea-port or in a battlefield etc. The antenna 12 provides a radar signal feed (indicated by the solid arrow) as an input to a computer workstation 14 having an associated TFT display monitor 16 and input device 18, which in this example is a standard keyboard and mouse.

The computer workstation 14 is an IBM-compatible personal computer arranged in a conventional desktop configuration. In order to convert the analogue radar signal feed into a digital signal suitable for the workstation 14, an analogue-to-digital converter (ADC) 20 is provided, as known in the art. In the example of FIG. 1, the ADC 20 is connected as a peripheral unit, external to the workstation 14. However, in other examples, the ADC 20 could be connected as an expansion card within the workstation 14.

It is also possible, in other examples, to have a customized card that can perform each of the capture, conversion, filtering and display functions on its own. In this way, both the acquisition and display processing can be accomplished on a single, self-contained, peripheral component.

The workstation 14 includes both a CPU 22 and a graphics processing environment comprising a video graphics card 24 with a GPU 26. The graphics card 24 also has an associated graphics memory 28. In the example of FIG. 1, the graphics card 24 has a GPU 26 that is based on a Nvidia chipset which has a graphics pipeline that can be programmed according to the OpenGL 2.0 Shading Language (GLSL) standard specification. This permits the pipeline to be controlled via specially written shader operations.

The graphics card 24 is connected to the motherboard (not shown) of the workstation 14 via an industry standard PCI-Express peripheral interface and provides an output VGA signal to the display monitor 16. An operator is able to view the radar images in real-time on the monitor 16 and may perform a number of different visualizations, as will be discussed later with reference to FIGS. 2 to 6.

In the example of FIG. 1, the GPU 26 has been programmed to convert the digitised radar images into a rectangular array of data, i.e. a polar store, by dividing each image into a plurality of azimuths and applying a polar-to-Cartesian coordinate transformation to each azimuth. Each azimuth is then stored as line of data within the polar store for subsequent processing. In this example, one line of data corresponds to 1×4096 8-bit values, i.e. a rectangle of size 1×4096. For optimum processing, the polar store is selected to be 4K lines deep, i.e. 4096×(1×4096) data lines.

When using a 4K by 4K polar store, approximately 480 scan rotations can be processed per minute (i.e. 480 rpm), while a 16K by 16K polar store will allow approximately 30 rpm. Higher resolution (e.g. 64K by 64K) may further be used but the processing demands begin to appreciably diminish the output of the GPU 26 on most existing cards. However, it is expected that the next generation of graphics cards will be able to support much higher processing speeds and thus all future speed increases are therefore consistent with the method of the present invention.

It is found that a 4K by 4K polar store conversion typically requires around 5% of the CPU's processing power, while the rest of the processing is performed by the GPU 26. Hence, it is evident that the present implementation significantly reduces the burden on the workstation's CPU 22, which avoids diminishing the performance of the workstation 14 when displaying images to the operator.

The radar display system 10 of FIG. 1, applies an azimuth filter in combination with a 'highest wins' filter to achieve a cross-azimuth filtering of the radar data in the polar store. The azimuth filter is applied across adjacent azimuths as a convolution filter having a Gaussian profile. Each azimuth is selected in turn, along with the two azimuths on either side of the selected azimuth (i.e. 5 in total). By convolving the azimuths with the Gaussian profile, this technique effectively combines the respective contributions of each of the return signals of any targets that are present within those azimuths.

In this way, the overall return signal is accentuated, which mitigates against the effect of background noise, thereby effectively boosting the signature of the target signal. Thus, it is found that a much improved representation of the target can be reproduced within the radar image.

In the example of FIG. 1, the convolution is achieved by way of a purpose written GLSL shader operation that makes use of the standard OpenGL blend modes. The shader samples each set of azimuths (hence, data lines in the polar store) and performs azimuth filtering to convolve the azimuths with the Gaussian profile. A total of 5 azimuths is found to be optimum for the filtering process based on existing graphics cards. A larger number of azimuths may be processed but as the filtered area increases so too do the demands on the GPU 26. Hence, to avoid significant delays in the processing pipeline it is preferred to use smaller samples of azimuths.

Of course, as GPU processing power increases in the future, larger filter samples may be used in accordance with the method of the present invention, depending on the particular arrangement and desired filtering result.

During the conversion of the images into data lines within the polar store, the GPU 26 applies a mapping function that maps each pixel within the image to a respective byte in one or more of the data lines. Since targets will generally extend across several azimuths, any particular pixel in the image may therefore be associated with one or more bytes in the polar store. The highest wins filter makes use of this pixel mapping in order to strengthen the return signal from smaller targets or targets giving rise to weaker return signals (e.g. highly absorbing surfaces etc.). The GPU 26 is therefore programmed via a shader to perform a highest wins filtering process on the azimuth sample selected by the shader. The shader can make use of the same sample as selected for the azimuth filtering (discussed above) or may select another sample. In either case, it is found that 5 azimuths are again optimum for this filtering process, however the technique can also be successfully implemented using only 3 azimuths, and is also achievable using only 2 azimuths. In the example of FIG. 1, the GPU 26 is programmed to process 5 azimuths for both the azimuth and highest wins filtering.

The highest wins filter operates by identifying the highest valued byte from among each of the values of the bytes associated with a particular pixel within the radar image. The value assigned to that pixel is then the highest valued byte. In this way, any return signal is consequently strengthened by representing the target by the highest available pixel value, thereby boosting its apparent significance within the radar image. As a result, weaker return signals may therefore be preserved and better distinguished over the background noise, which thereby permits easier identification of the target within the radar image.

Once the images have been filtered according to the cross-azimuth filtering technique, they are then displayed in real-time to the operator via the monitor 16 of workstation 14.

To render images to the display, the GPU dynamically calculates a plurality of textures, each texture being an object that corresponds to a respective data line within the polar store, e.g. a rectangle of size 1×4096 8-bit values. Depending upon the particular display mode, any number of textures may be rendered by the GPU to generate some part, or the whole, of the radar image data within the polar store. The actual textures that are rendered to the display screen will depend upon the particular projected viewing angle and/or current zoom level, as for example, a single data element in the polar store may be subject to a zoom level that requires the element to fill the entire screen. In this way, the texture formed by the GPU would be scaled in such a way that only that data element was displayed.

In the example of FIG. 1, the operating system of workstation 14 permits windowing operations. Suitable operating systems therefore include Microsoft Windows, AppleMac O/S and Unix/Linux platforms running X Window managers etc. As a result therefore, the radar images may be displayed within one or more dedicated windows within the operating system environment of the monitor 16.

To enable the operator to control how the radar images are displayed, a graphical user interface (GUI) is provided that is installed within the operating system of the workstation 14. This GUI is implemented as a C application on a Linux platform using a platform independent GTK, which provides real-time control of the different display modes that may be applied to the radar images. Hence, in this way, specific shader operations can be invoked to achieve any particular visual effect or display mode. However, the GUI may alternatively be implemented in any suitable language that supports bindings to libraries required to address the underlying graphics hardware, e.g. C++, Python, Java, Ruby, C# etc.

Figure 2:
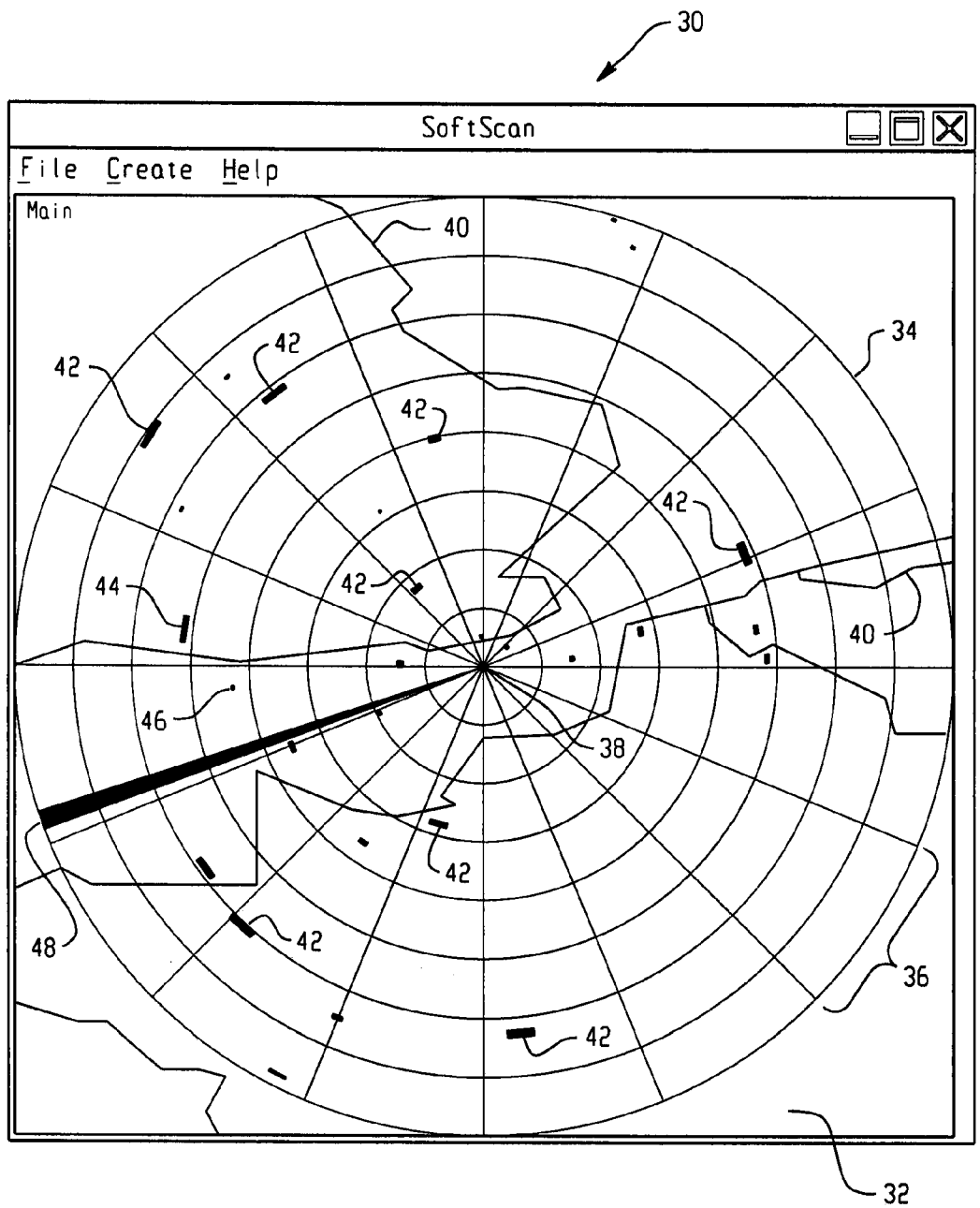
FIG. 2 is an example screenshot of a radar image generated by the radar display system of FIG. 1.

Referring now to FIG. 2, there is shown an example screenshot of a radar image 30 generated according to the method of the present invention. The radar image 30 is displayed according to one of the selected display modes that may be directly controlled by the GUI. In this example, the radar image 30 is shown as a 2-dimensional plan view (i.e. as seen from above) as conventionally displayed by a CRT display screen. The radar image 30 comprises an underlay image 32 in the form of a bitmap that includes a circular grid 34 of concentric circles having radial segments 36. The grid 34 is centered on the point of origin 38 of the radar signals, which corresponds to the site of the antenna 12.

The underlay image 32 also includes the outline of the coastlines 40 of the land masses within the monitored area. Although not shown in the grayscale image of FIG. 2, the land masses may be contrastingly colored in relation to bodies of water, such as lakes, seas or oceans etc. In FIG. 2, the coastlines 40 have been indicated by a contrasting color to that of the background and therefore appear as darker lines.

Of course, it is to be appreciated that the underlay image 32 is specific to the particular region that is being monitored by the radar display system and hence, the underlay image will change depending on the location of the antenna 12. The color rendition of the underlay can however be controlled by the GUI, so that it may be switched between day and night modes etc. to emulate hours of sunshine and darkness for instance.

According to some display modes, the underlay image 32 can also be updated so that if the point of origin (i.e. radar source) moves, such as in arrangements where the radar is mounted on a moving vehicle, the underlying features change. In this way, a rendered coastline or land mass, for example, can be updated as the source passes by.

The GPU 26 overlays the radar data on top of the underlay image 32, so that any targets 42 within the monitored area are displayed within the grid 34. The cross azimuth filtering of the azimuths results in improved target definition and consequent rendition within the image. Hence, the targets within radar image 30 are better defined, with weaker return signals being effectively boosted. As shown in FIG. 2, a large number of targets 42 have been identified within the grid 34, which includes both stronger and weaker return signals (for instance, compare traces indicated by 44 and 46).

Therefore, it is evident that the present method provides significant advantages in identifying weaker signals and consequently enhances the safety of air/sea/land vehicles traversing the monitored area. Moreover, in surveillance applications the boosting of weaker signals enables an operator to identify smaller vehicles or projectiles etc. which may pose a threat to the security of the monitored area and/or other vehicles.

The GPU 26 is also responsible for rendering the sweeping radial arm 48 that rotates synchronously with the antenna 12. Again, this feature is rendered in a contrasting color to that of the background and targets within the image 30.

Figure 3:
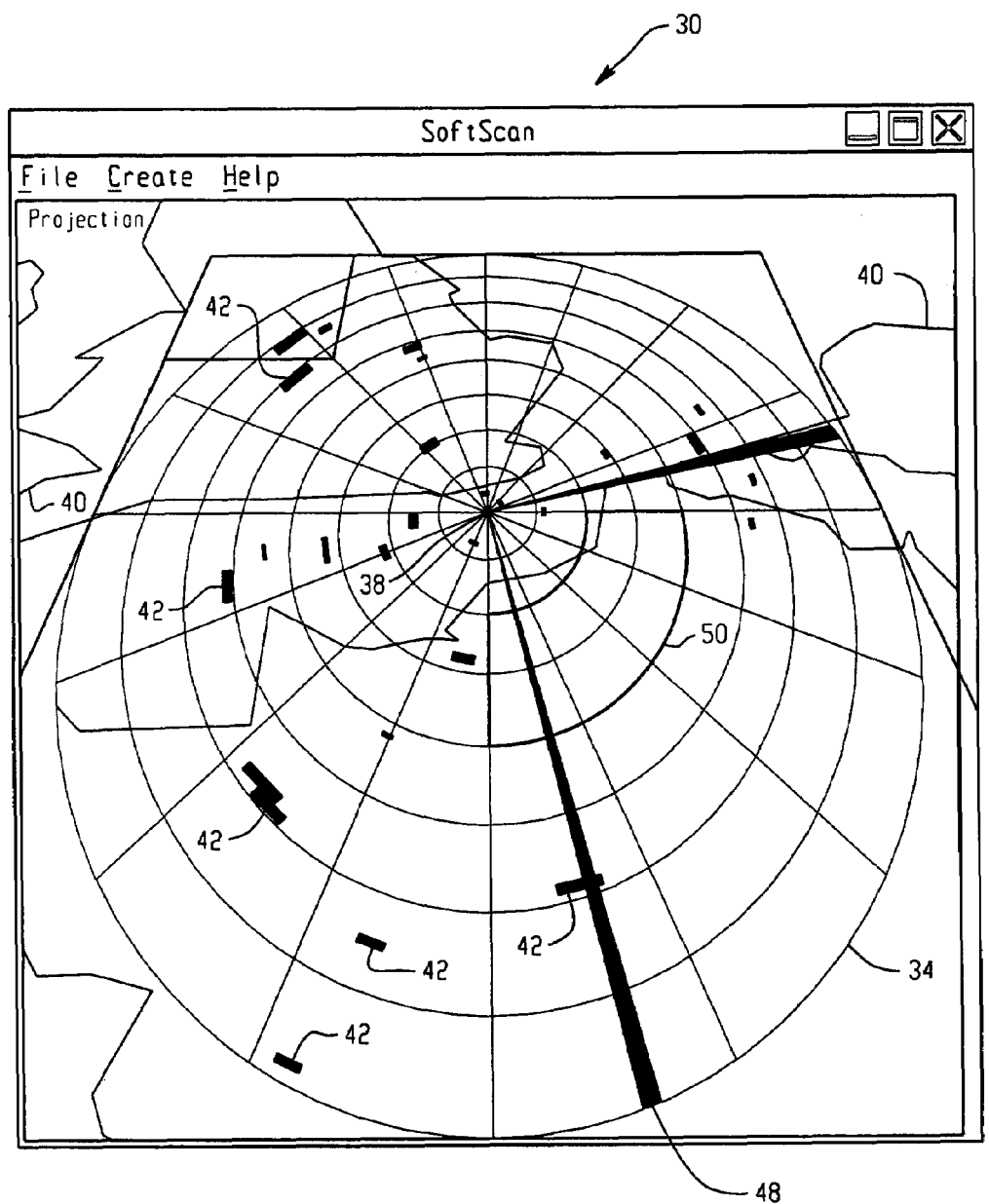
FIG. 3 is an example screenshot of another radar image generated according to a different display mode of the radar display system of FIG. 1, wherein the point of view of the radar image from the perspective of the observer has been manipulated.

The GUI allows the radar images to be manipulated and controlled to achieve any number of visual display effects according to numerous different display modes. Therefore, as shown in FIG. 3, the projected orientation (i.e. viewing angle) of the radar image 30 can be adjusted in real-time, so that the GPU 26 can render the image according to any desired viewing angle. In this way, the radar image 30 can be imparted with a sense of depth, with some targets 42 appearing as foreground objects and others appearing as background objects.

Another useful feature that the GUI permits is that specific regions within the grid 34 can be selected for further scrutiny, as indicated by the arcuate section 50, which allows an operator to then zoom in on this region to monitor any desired targets and/or other activity.

Figure 4:
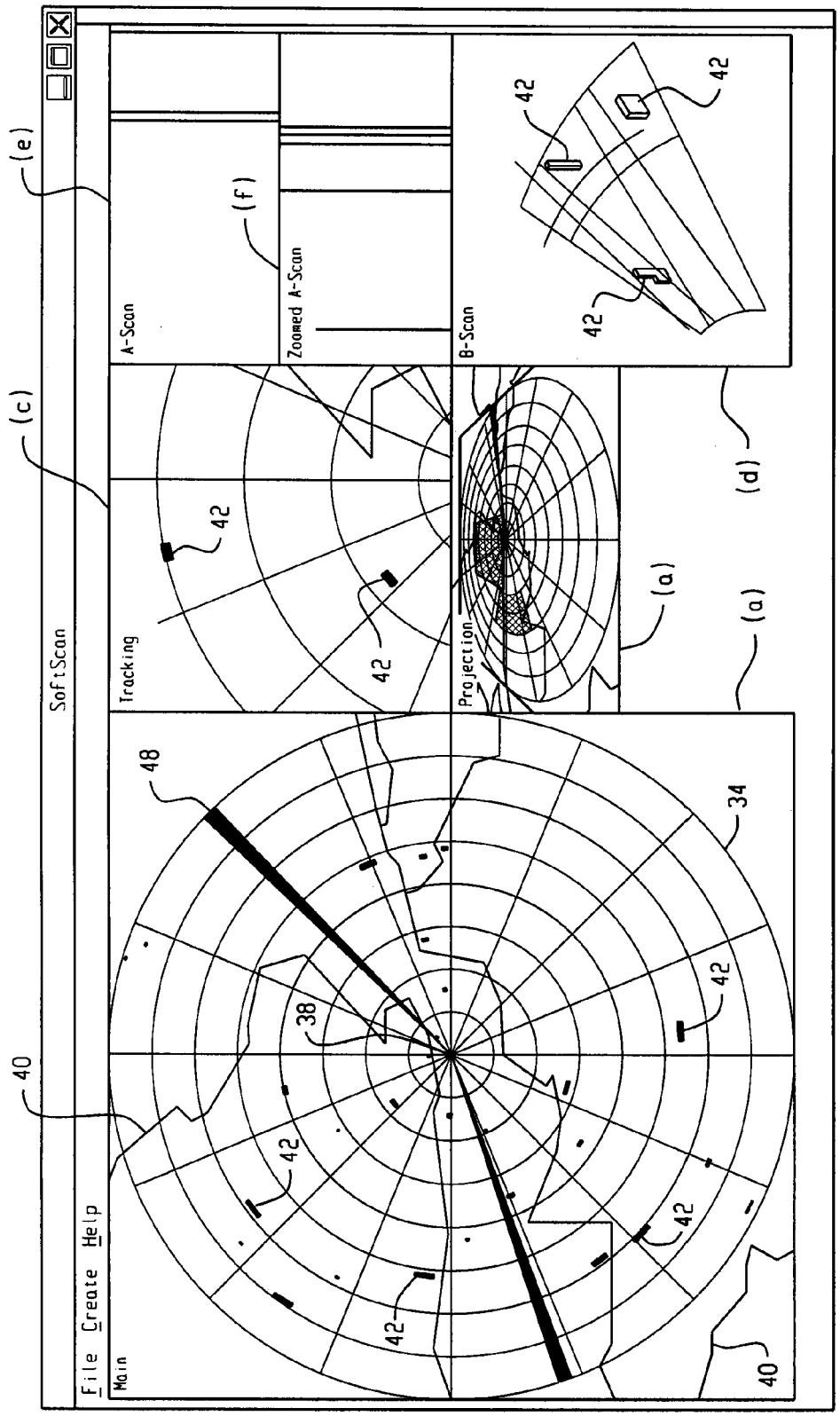
FIG. 4 is an example screenshot of another radar image generated according to a different display mode of the radar display system of FIG. 1, wherein a plurality of windows are simultaneously displayed by the display screen, and each window includes a different display mode of the radar image.

According to another display mode, the operator has the opportunity to view multiple images and/or selected regions by way of a multi-segment window, as shown in FIG. 4. In this example, the radar image 30 of FIG. 2 can be re-sized and positioned within a portion (a) of the multi-segment window, while various other related aspects of the image can be selected for closer scrutiny. Hence, for example, a projection plot (b) can also be drawn that allows the operator to simultaneously have both a plan view and an angled view of the monitored area. One or more regions may also be selected, as shown in (c), when it is desired to track a particular target 42 as it traverses the monitored area. In this way, an operator can still keep his attention on the whole area, while also monitoring a particular target in more detail.

It is also possible to zoom in on particular targets or scan regions and display the results within separate dedicated portions within the multi-segment window, as shown in (d), where for example, the bottom plot is a 3-dimensional rendered image of three targets of interest within the image drawn in (a).

An operator may also inspect any line of data within the polar store as a suitable line graph, as shown in portion (e) as the 'A-scan', or zoom in on this graph (i.e. a 'Zoomed A-Scan') as illustrated by portion (f), to scrutinize any particular point of interest.

Hence, it is to be understood that the GUI allows any number of combinations of different display modes, either within a single multi-segment window or multiple separate windows, each with real-time updates and monitoring, and permitting resizing of the windows as desired.

Figure 5:
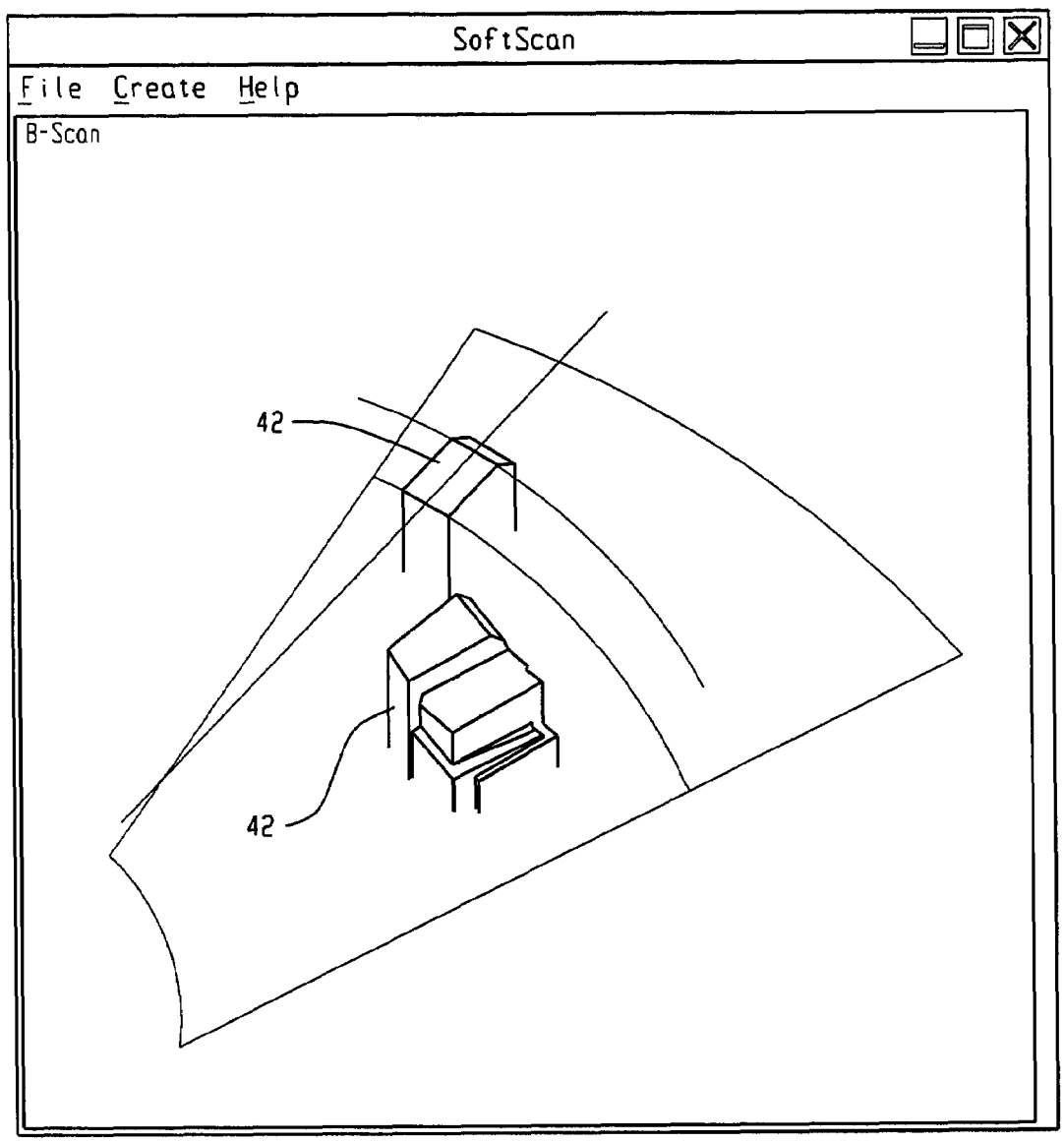
FIG. 5 is an example screenshot illustrating a 3-dimensional close-up of targets within the radar image of FIG. 3, wherein each target includes a depth dimension.

As an example of the 3-dimensional rendering of targets within the images, FIG. 5 illustrates a section selected for further scrutiny, in which two targets have been drawn with a rendered depth perception. Such rendering can assist an operator in identifying targets and may also be useful in determining particular vehicle profiles, as the rendered traces may give some indication as to what the target actually is. Any target within the radar image 30 may be selected and drawn in this way, permitting an operator to better scrutinize identified targets.

Such functionality is clearly not possible with existing CRT display systems, and therefore the present implementation offers significant advantages in visualization of the data, which therefore makes best use of the radar information.

Figure 6:
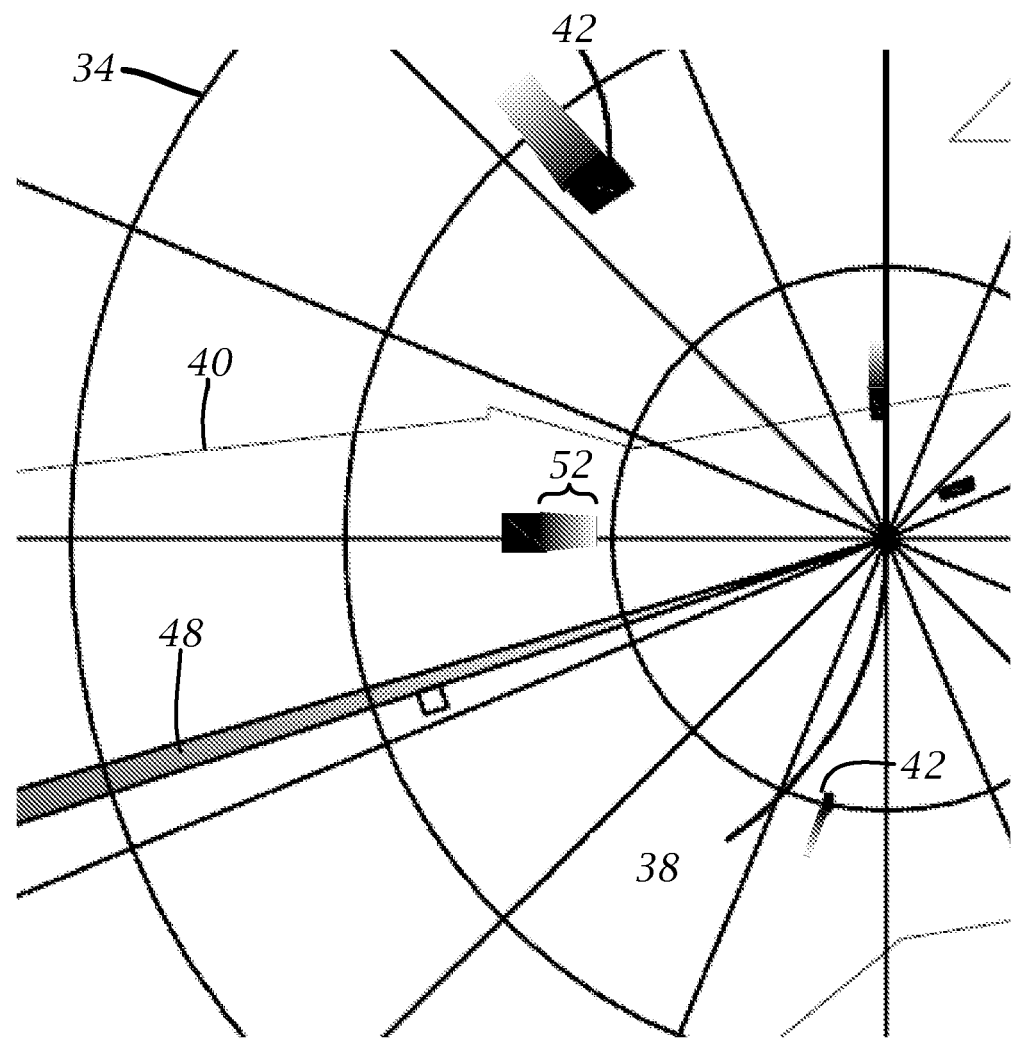
FIG. 6 is an example screenshot illustrating trailing target images according to an aspect of the present invention, wherein each target includes a gradually fading tail displayed by gradually fading the intensity of pixels along a path traveled by the target to emulate a persistence of phosphor of a cathode-ray-tube display screen.

A fading effect is implemented by way of a shader operation in the graphics pipeline that emulates the persistence of a CRT phosphor screen. Therefore, as shown in FIG. 6, targets 42 can be rendered such that they leave a trail 52 in successive images as they traverse the monitored area. Hence, by action of the shader, a particular target will leave a streaked trail 52 as it moves between images, which thereby can assist the operator in determining the header and/or velocity of the target 42. As shown in FIG. 6, some targets 42 are found to be moving tangentially to the point of origin 38, while others are moving radially towards/away from the point of origin 38.

The present implementation is also able to merge more than one radar image set. Therefore, should two or more monitored areas overlap (e.g. arising from multiple sources), the radar data from each PPI can be displayed within the same display window. In such arrangements, the workstation 14 is provided with each respective radar signal feed, which after digitisation and processing can be displayed as a single image having overlapping range and azimuth grids. Each grid and associated targets can be coloured differently between the two or more PPIs, and a shader operation can be invoked to alter the displayed colors where the radar traces overlap/intersect.

Illustrative embodiments have been described, hereinabove. It will be apparent to those skilled in the art that the above devices and methods may incorporate changes and modifications without departing from the general scope of this invention. It is intended to include all such modifications and alterations within the scope of the present invention. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method of generating a radar image to be displayed by a radar system, said method including:
   receiving range data and azimuth data carried by a radar signal transmitted from a radar antenna in communication with the radar system, wherein the range data and the azimuth data represent the radar image as a plurality of azimuth segments that collectively form the radar image in a polar coordinate system;
   translating the range data and the azimuth data into abscissa data and ordinate data that represent the radar image in a Cartesian coordinate system;
   filtering noise from the radar image by:
      utilizing a return signal contribution reflected by a target from at least two immediately-adjacent azimuth segments to render a representation of the target in the radar image,
      selecting a highest pixel value from a plurality of different pixel values assigned to be displayed by a common pixel of a radar display to be displayed by the common pixel, or
      a combination of both utilizing the return signal contribution reflected by the target from the at least two immediately-adjacent azimuth segments and selecting the highest pixel value from the plurality of different pixel values assigned to the common pixel to render the representation of the target to be included as a portion of the radar image to be displayed; and
   generating the radar image including the target to be displayed by a display screen to an operator.

2. The method according to claim 1 further including converting the radar signal feed from an analog signal to a digital signal.

3. The method according to claim 2, wherein converting the radar signal to a digital signal is performed by an analog-to-digital converter provided to a graphics processing unit of the radar system independent of a central processing unit for controlling general operation of the radar system as a whole.

4. The method according to claim 1, wherein translating the range data and the azimuth data into abscissa data and ordinate data, filtering the noise from the radar image, or both translating the range data and the azimuth data into abscissa data and ordinate data, and filtering the noise from the radar image is performed by a graphics processing unit of the radar system independent of a central processing unit for controlling general operation of the radar system as a whole.

5. The method according to claim 1, wherein one of translating the range data and the azimuth data and filtering the noise from the radar image is performed by a graphics processing unit of the radar system independent of a central processing unit for controlling general operation of the radar system as a whole, and another of translating the range data and the azimuth data and filtering the noise from the radar image is performed by a different processing unit provided to the radar system.

6. The method according to claim 5, wherein the different processing unit is the central processing unit for controlling general operation of the radar system as a whole.

7. The method according to claim 1 further including transmitting the radar image over a communication network to be displayed by the display screen.

8. The method according to claim 1 further including storing range data and azimuth data representing the plurality of azimuth segments that collectively form the radar image as an array in a computer-readable memory.

9. The method according to claim 1 further including manipulating a point of view of the radar image to be displayed by the display screen in at least one of a first dimension and a second dimension responsive to receiving an input from the operator indicating a desired viewpoint of the radar image.

10. The method according to claim 9, wherein manipulating the point of view of the radar image further includes adjusting an orientation of the radar image in a third dimension.

11. The method according to claim 9, wherein manipulating the point of view of the radar image further includes conducting a geometric distortion to maintain substantially-overhead point of view of the radar image subsequent to manipulating the point of view.

12. The method according to claim 1 further including generating a plurality of different points of view of the radar image to be simultaneously displayed by the display screen.

13. The method according to claim 1 further including displaying the radar image over and underlay image representing a reference point of a target in the radar image.

14. The method according to claim 1, wherein the target is to be displayed as a graphical depiction of the target in real time by pixels of the display screen, the method further including gradually fading an intensity of the pixels displaying the target in the radar image to emulate a persistence of phosphor of a cathode-ray-tube display screen.

15. The method according to claim 14, wherein gradually fading the intensity of the target in the radar image is controlled by a graphics processing unit of the radar system independent of a central processing unit for controlling general operation of the radar system as a whole.

16. The method according to claim 1, wherein a plurality of the azimuth segments collectively forming the radar image overlap to each detect a target in a common region.

17. The method according to claim 16, wherein filtering noise from the radar image includes comparing a return signal contribution reflected from the common region for each overlapping azimuth segment, and generating the radar image to include the target within the common region if each return signal contribution is indicative of a presence of the target within the common region.

18. A physical computer-readable medium storing computer executable instructions for performing the method of claim 1.

19. A radar system including:
a radar antenna for transmitting an outgoing signal and receiving a return signal contribution reflected by a target interrogated by said outgoing signal;
an analog-to-digital converter for converting a radar feed signal transmitted from the radar antenna communicating the return signal contribution reflected by the target;
a computer-readable memory for storing, at least temporarily, an array of range data and azimuth data carried by the radar feed signal, wherein the range data and the azimuth data represent the radar image as a plurality of azimuth segments that collectively form the radar image in a polar coordinate system;
a radar scan converter for translating the range data and the azimuth data into abscissa data and ordinate data that represent the radar image in a Cartesian coordinate system;
a filtering component for filtering noise from the radar image by:
utilizing the return signal contribution reflected by the target from at least two immediately-adjacent azimuth segments to render a representation of the target in the radar image,
selecting a highest pixel value from a plurality of different pixel values assigned to be displayed by a common pixel of a radar display to be displayed by the common pixel, or
a combination of both utilizing the return signal contribution reflected by the target from the at least two immediately-adjacent azimuth segments and selecting the highest pixel value from the plurality of different pixel values assigned to the common pixel to render the representation of the target to be included as a portion of the radar image to be displayed;
a graphics processing unit for generating the radar image including the target to be displayed;
a display screen for displaying the radar image generated by the graphics processing unit to an operator; and
a central processing unit for controlling interactions among radar system components.

20. The radar system according to claim 19, wherein the graphics processing unit includes a programmable pipeline and generates the radar image independent of the central processing unit.

21. The radar system according to claim 19, wherein the filtering component includes a physical computer-readable medium storing computer-executable logic to be executed for filtering noise from the radar image.

22. The radar system according to claim 21, wherein execution of the computer-executable logic performs a Gaussian convolution with the return signal contribution reflected by the target to minimize noise in the radar image.

23. The radar system according to claim 19, wherein the graphics processing unit includes one or more of:
the computer-readable memory for storing, at least temporarily, an array of range data and azimuth data carried by the radar feed signal;
the radar scan converter; and
the filtering component.

* * * * *